United States Patent [19]

Fierkens et al.

[11] Patent Number: 4,710,094
[45] Date of Patent: Dec. 1, 1987

[54] AUTOMATIC CONTINUOUSLY CYCLEABLE MOLDING SYSTEM AND METHOD

[75] Inventors: Richardus H. J. Fierkens, Herwen; Ireneus J. T. M. Pas, Rozendaal, both of Netherlands

[73] Assignee: ASM Fico Tooling, b.v., Herwen, Netherlands

[21] Appl. No.: 798,679

[22] Filed: Nov. 15, 1985

Related U.S. Application Data

[62] Division of Ser. No. 586,855, Mar. 6, 1984, Pat. No. 4,575,328.

[51] Int. Cl.⁴ .............................................. B65G 25/00
[52] U.S. Cl. .................................... 414/752; 294/64.1; 198/468.4

[58] Field of Search .......................... 198/468.4, 860.5; 414/752; 294/64.1, 64.2, 65

[56] References Cited

U.S. PATENT DOCUMENTS

| | | | |
|---|---|---|---|
| 4,466,531 | 8/1984 | Baugher et al. | 414/752 |
| 4,550,551 | 11/1985 | Desantis | 414/752 |
| 4,605,116 | 8/1986 | Miller | 198/860.5 |

*Primary Examiner*—Joseph E. Valenza
*Attorney, Agent, or Firm*—Harry M. Weiss & Associates

[57] ABSTRACT

An automatic continuously cycleable molding system wherein a plurality of mold sets are transported in predetermined timed cycles through a series of work stations wherein the various molding, curing and workpiece handling operations are accomplished, and wherein the mold sets are recirculatingly moved through the system for repeated usage.

2 Claims, 4 Drawing Figures

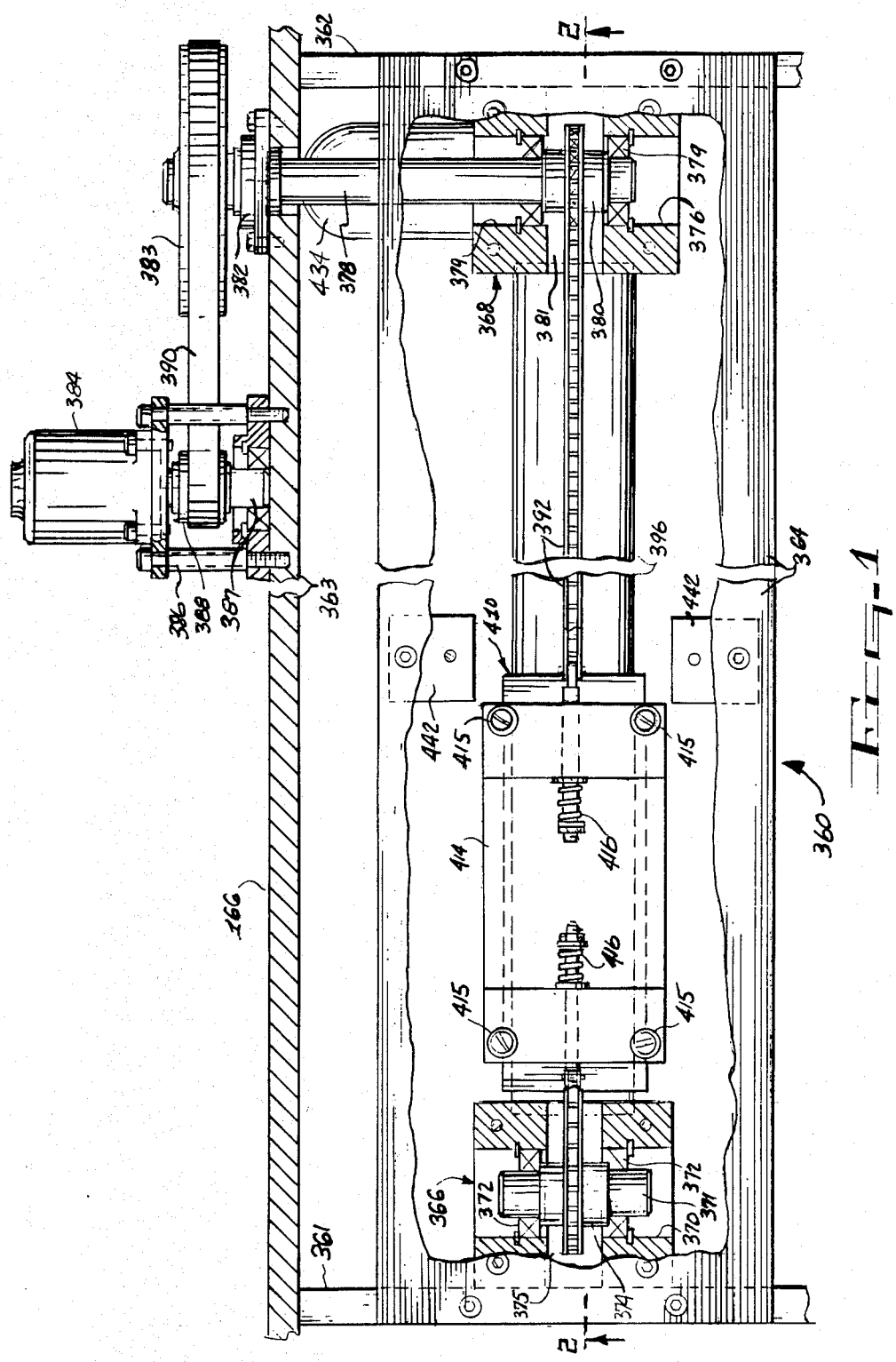

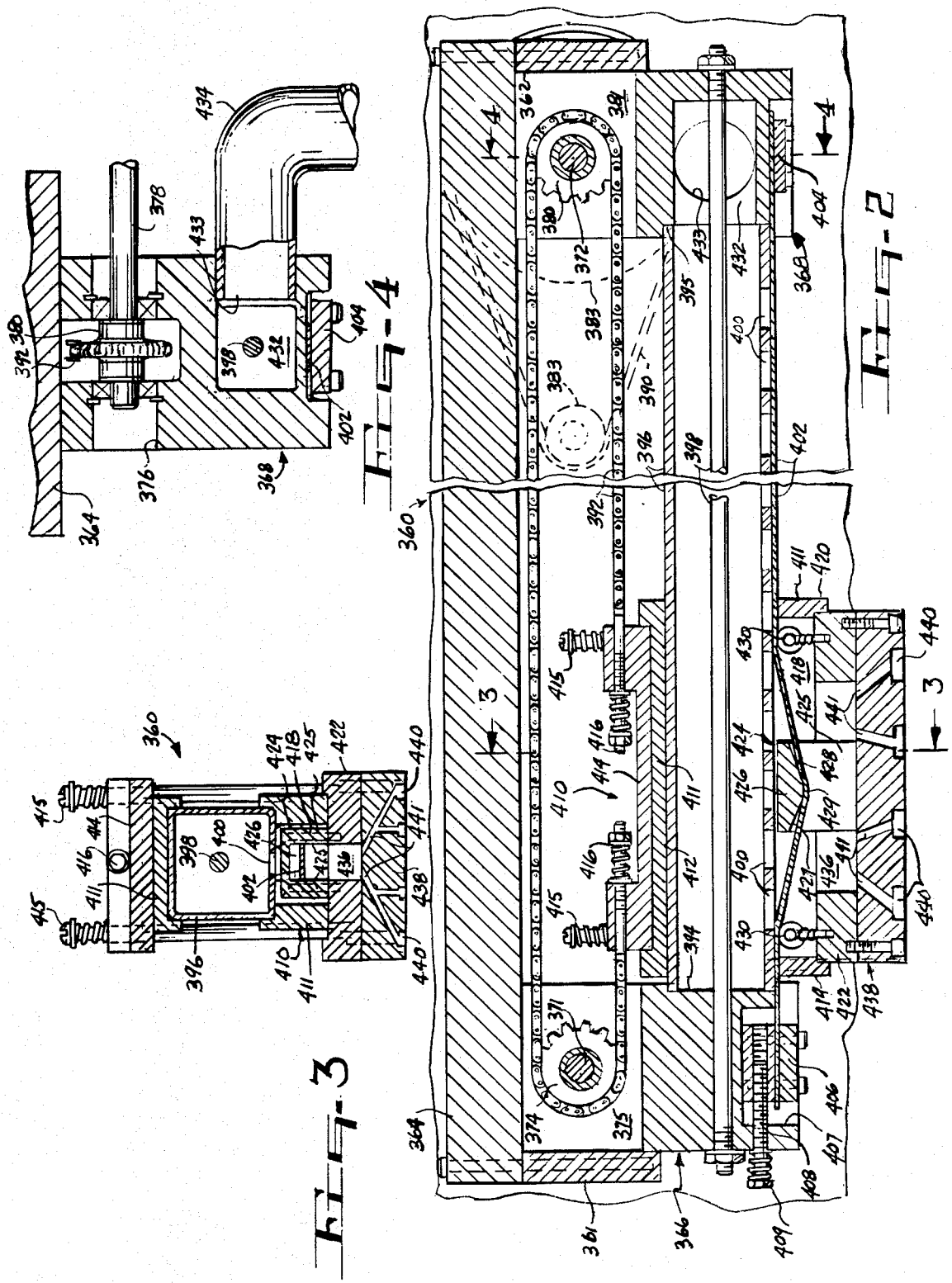

AUTOMATIC CONTINUOUSLY CYCLEABLE MOLDING SYSTEM AND METHOD

This is a Division of application Ser. No. 586,855, filed Mar. 6, 1984, now U.S. Pat. No. 4,575,328.

BACKGROUND OF THE INVENTION

1. Field of the Invention

The present invention generally relates to a workpiece conveyor mechanism and, more specifically to a workpiece conveyor mechanism for transporting electronic components, or other workpieces, in a molding system from an arranging mechanism to a workstation wherein the workpieces are placed in a bottom mold.

2. Description of the Prior Art

Over the years various mechanical arrangements have been developed for use in the manufacturing of equipment utilized in fabrication of semiconductor packages. However, none of the past mechanical arrangements are believed to disclose the features that are hereinafter described.

SUMMARY OF THE INVENTION

It is an object of this invention to provide a conveyor mechanism for transporting electronic components or other workpieces.

It is a further object of this invention to provide a conveyor mechanism for transporting electronic components or other workpieces from an arranging mechanism.

It is a still further object of this invention to provide a conveyor mechanism for transporting electronic components, or other workpieces, to a workstation for placement into molds.

The foregoing and other objects, features and advantages of this invention will be apparent from the following, more particular, description of the preferred embodiments of this invention, as illustrated in the accompanying drawings.

BRIEF DESCRIPTION OF THE DRAWINGS

FIG. 1 is a fragmentary and partially broken away plan view of a conveyor mechanism which is disposed between an arranging mechanism and a subsequent molding workstation to move the workpieces from the receiving and arranging mechanism to the bottom mold loading workstation.

FIG. 2 is a fragmentary sectional view taken along the line 2—2 of FIG. 1.

FIG. 3 is a fragmentary sectional view taken along the line 3—3 of FIG. 2.

FIG. 4 is a fragmentary sectional view taken along the line 4—4 of FIG. 2.

DESCRIPTION OF THE PREFERRED EMBODIMENT

Leadframes 102 which are arranged in side-by-side relationship are moved from an arranging mechanism to a workstation wherein the leadframes 102 are positioned in a bottom mold, and this movement is accomplished by a conveyor means 360 which is shown in FIGS. 1, 2, 3 and 4.

The conveyor means 360 is mounted between a spaced pair of support members 361 and 362, which extend transversely of suitable frame elements 363 (one shown) of the system frame 166. The conveyor means 360 includes a beam 364 the opposite ends of which are attached to the support members 361 and 362 so as to extend therebetween. A first housing 366 is dependingly mounted on the end of the beam which is proximate to the support member 361, with that end being hereinafter referred to as the workpiece pick-up end of the conveyor means 360. Another, or second housing 368 is similarly mounted on the opposite end of the beam 364 which will hereinafter be referred to as the workpiece delivery end of the conveyor means 360.

The first housing 366 has a bore 370 formed therein, as seen in FIG. 1, with a shaft 371 being journaled for rotation therein on suitable bearings 372. A driven sprocket 374 is fixed on the shaft 371 for rotation in a cross-slot 375 which opens toward the second housing 368. The second housing 368 is similarly provided with a bore 376 in which a drive shaft 378 is journaled in the bearings 379. A drive sprocket 380 is mounted fast on the drive shaft 378 for rotation in the transverse slot 381 provided in the second housing 368 with the slot 381 opening toward and in alignment with the slot 375 of the first housing 366. The drive shaft 378 extends from the bore 376 and is journaled in a bearing assembly 382 which is carried on the frame element 362 and has a driven pulley 383 mounted on the extending end thereof. A reversibly driveable electric motor 384 is mounted on a motor mount assembly 386 which is carried on the frame element 362 and the electric motor 384 has an output shaft 387 upon which a drive pulley 388 is fixedly mounted. An endless belt 390 passes around the two pulleys 383 and 388 for rotational driving of the drive sprocket 380. A chain 392 is carried on the two sprockets 383 and 388 as will hereinafter be described in detail.

As seen in FIG. 2, the first housing 366 is formed with a recess 394 below the cross-slot 377 and the second housing 368 is similarly provided with a recess 395. The recesses 394 and 395 of the housings 366 and 368, respectively, are aligned and open toward each other, and the opposite ends of a tube 396 are disposed in the recesses so that the tube extends between the pick-up and delivery ends of the conveyor means 360. An elongated rod 398 having threaded ends extends axially through the tube and oppositely through the two housings 366 and 368, with suitable nuts carried thereon to hold the tube in place between the two housings.

The tube 396 is preferably of square cross seetion and has a plurality of ports 400 formed through the bottom wall of the tube with the ports being formed in spaced increments along the length of the tube. An elongated deflectable band 402, preferably formed of thin gauge steel, is disposed in coextending contiguous engagement with the downwardly facing surface of the bottom wall of the tube 396 for selectively opening and closing the ports 400 as will hereinafter be described in detail. One end of the band 402 is fixedly attached to the second housing 368 by means of the mounting block 404, and the opposite end of the band is captively retained in the draw block 406 which is mounted in a downwardly opening cavity 407 provided in the first housing 366. The draw block 406 is mounted on a bolt 408 which passes freely through an aperture provided in the housing 366 with a spring 409 being interposed between the head of the bolt 408 and the housing 366 so as to bias the bolt, and thus the draw block 406 to the left in FIG. 2. In this manner, the band 402 is drawn taut to normally close the ports 400 of the tube 396, and yet allow the draw block 406 to move to the right when the band is deflected for selective port opening as will be described.

A carriage 410 is supported on the tube 396 and is movable along the length of the tube between the pick-up and delivery ends of the conveyor means 360. The carriage 410 includes a two-piece housing 411 which defines a bore 412 through which the tube 396 loosely extends so that the tube supports the carriage and allows it to freely slide along the tube. A bracket 414 is mounted atop the housing 411 by means of the shock absorbing spring-screw arrangement shown at 415. The opposite ends of the hereinbefore mentioned chain 392 are mounted on the shock absorbing spring-stud devices shown at 416 to opposite ends of the bracket 414. Thus, the hereinbefore described sprocket-chain assembly will more the carriage 410 back and forth along the tube 396 by operation of the reversibly driveable motor 384.

The carriage housing 411 is provided with a longitudinally extending chamber 418 therein which is closed on its opposite ends by the housing end walls 419 and 420, on its lower end by a plate 422 and opens upwardly into the bore 412 in which the tube 396 is disposed. As shown in FIG. 3, the spring-screw devices 415 which mount the hereinbefore described bracket 414 on the housing also secure the bottom plate 422 thereto. The plate 422 is provided with an upstanding band deflection member 424 which is of inverted U-shape as seen best in FIG. 3. The band 402 passes between the spaced legs 425 of the deflection member 424 below the bight portion 426 thereof. The downwardly facing surface of the bight portion 426 is formed with inclined cam surfaces 427 and 428 which slope upwardly and oppositely from a central bearing surface or apex 429. The plate 422 also has a spaced pair of spring-loaded rollers 430 mounted on opposite sides of the deflection member 424 and upstanding from the plate 422 into bearing engagement with the band 402.

When the carriage 410 is moved along the tube 396, the rollers 430 will roll along the downwardly facing surface of the band 402 and the apex 429 and cam surfaces 427 and 428 of the deflection member 424 will slide along the upwardly facing surface of the band 402 thus deflecting the portion which is between the rollers 430 away from the tube 396 to open the ports 400 which lie between the rollers.

As seen in FIG. 4, the second housing 368 is provided with a chamber 432 which opens into the recess 395 thereof and is thus in communication with the bore of the tube 396. The chamber 432 is provided with a lateral port 433 in which one end of a conduit means 434 is mounted. The other end (not shown) of the conduit means 434 is for connection to a suitable vacuum pump (not shown) or other suitable mechanism which may be located externally or internally of the system 100 as desired. Thus, a negative static pressure, or partial vacuum, is drawn in the tube 396 to cause air flow movement upwardly through a passage 436 provided in the plate 422, through the ports 400 which are opened by the deflector means 424 and into the tube.

A vacuum head 438 is interchangeably mounted on the downwardly facing surface of the plate 422, and the head is provided with a suitable array of ports 440 and passages 441 which are designed to pick up whatever workpieces are to be moved by the conveyor means 360. More specifically, the ports 440 in the illustrated vacuum head 438 are located so as to bear against the side rails 106 of the leadframes 102 when the leadframes are being processed in the molding system.

The conveyor means 360 is disposed so that its workpiece pick-up end is operably coupled with the arranging mechanism, and its product delivery end is operably coupled with the workstation wherein the leadframes 102 are positioned in a bottom mold.

What we claim is:

1. A conveyor mechanism for transporting workpieces comprising; in combination:
   (a) an elongated tube means for providing a bore and a plurality of ports passing therethrough;
   (b) said plurality of ports of said elongated tube means being formed in longitudinally spaced increments along the length thereof;
   (c) an elongated band means in coextensive contiguous engagement with said tube means for closing said plurality of ports;
   (d) said band means being suitable for being deflectable out of port closing engagement with said tube means;
   (e) a carriage means mounted on said tube for defining a chamber which encloses a portion of said tube means and a portion of said band means;
   (f) a means coupled to said carriage means for reciprocal movement thereof along the length of said tube means;
   (g) a holding means mounted in said chamber of said carriage means for engaging said band means at spaced apart locations;
   (h) deflecting means mounted in said chamber of said carriage means for engagement with said band means;
   (i) said deflecting means being operably engaged with said band means at a portion which is between the spaced apart locations where said holding means engages said band means to deflect a portion of said band means out of port closing engagement with said tube means to place said bore of said tube means in communication with said chamber of said carriage means;
   (j) a pick-up head means for being carried on said carriage means and being in fluid communication with said chamber; and
   (k) a means coupled to said tube for selectively producing a negative static pressure therein.

2. A conveyor mechanism for transporting workpieces comprising; in combination:
   (a) an elongated tube means for providing a bore and a plurality of ports passing therethrough;
   (b) said plurality of ports of said elongated tube means being formed in longitudinally spaced increments along the length thereof;
   (c) an elongated band means in coextensive contiguous engagement with said tube means for closing said plurality of ports;
   (d) said band means being suitable for being deflectable out of port closing engagement with said tube means;
   (e) a carriage means mounted on said tube for defining a chamber which encloses a portion of said tube means and a portion of said band means;
   (f) a means coupled to said carriage means for reciprocal movement thereof along the length of said tube means;
   (g) a holding means mounted in said chamber of said carriage means for engaging said band means at spaced apart locations;
   (h) deflecting means mounted in said chamber of said carriage means for engagement with said band means;

(i) said deflecting means being operably engaged with said band means at a portion which is between the spaced apart locations where said holding means engages said band means to deflect a portion of said band means out of port closing engagement with said tube means to place said bore of said tube means in communication with said chamber of said carriage means;

(j) a pick-up head means for being carried on said carriage means;

(k) said pick-up head means having at least one workpiece engaging recess which is in communication with said chamber of said carriage means; and (l) a means coupled to said tube for selectively producing a negative static pressure therein.

* * * * *